United States Patent
Chan et al.

(10) Patent No.: US 11,645,591 B2
(45) Date of Patent: May 9, 2023

(54) DYNAMIC AGENT MANAGEMENT FOR MULTIPLE QUEUES

(71) Applicant: ServiceNow, Inc., Santa Clara, CA (US)

(72) Inventors: Victor Chung-Wai Chan, Saratoga, CA (US); Scott Michael Rhodes, Torrance, CA (US); Prithvi Yoganand, Dublin, CA (US)

(73) Assignee: ServiceNow, Inc., Santa Clara, CA (US)

( * ) Notice: Subject to any disclaimer, the term of this patent is extended or adjusted under 35 U.S.C. 154(b) by 33 days.

(21) Appl. No.: 17/154,741

(22) Filed: Jan. 21, 2021

(65) Prior Publication Data
US 2021/0142244 A1     May 13, 2021

Related U.S. Application Data

(63) Continuation of application No. 16/116,679, filed on Aug. 29, 2018, now Pat. No. 10,929,790.

(51) Int. Cl.
*G06Q 10/0631* (2023.01)
*H04L 41/5074* (2022.01)
*H04M 3/523* (2006.01)

(52) U.S. Cl.
CPC . *G06Q 10/06311* (2013.01); *G06Q 10/06316* (2013.01); *H04L 41/5074* (2013.01); *H04M 3/5232* (2013.01)

(58) Field of Classification Search
None
See application file for complete search history.

(56) References Cited

U.S. PATENT DOCUMENTS

| | | | |
|---|---|---|---|
| 5,987,115 A | 11/1999 | Petrunka | |
| 6,134,530 A * | 10/2000 | Bunting | G06Q 10/06311 379/265.09 |
| 6,609,122 B1 | 8/2003 | Ensor | |
| 7,028,301 B2 | 4/2006 | Ding | |
| 7,062,683 B2 | 6/2006 | Warpenburg | |
| 7,131,037 B1 | 10/2006 | LeFaive | |
| 7,170,864 B2 | 1/2007 | Matharu | |
| 7,350,209 B2 | 3/2008 | Shum | |
| 7,610,512 B2 | 10/2009 | Gerber | |
| 7,617,073 B2 | 11/2009 | Trinon | |

(Continued)

*Primary Examiner* — Romain Jeanty
(74) *Attorney, Agent, or Firm* — Fletcher Yoder PC

(57) ABSTRACT

An example system for dynamic agent management involving multiple queues is presented. The system may include a remote network management platform that manages a network by way of a computational instance. A first group and a second group of agents may be assigned to address work items in a first queue in the computational instance. The second group may also be assigned to address and prioritize work items in a second queue in the computational instance. A computing device within the computational instance may assign a work item originating from a client device in the managed network into the first queue according to routing rules. The assignment may cause a timer to record a duration that the work item is in the first queue. The computing device may assign one of the second group of agents to address the work item based on the duration exceeding a pre-determined value.

20 Claims, 12 Drawing Sheets

(56) References Cited

U.S. PATENT DOCUMENTS

| | | |
|---|---|---|
| 7,689,628 B2 | 3/2010 | Garg |
| 7,746,362 B2 | 6/2010 | Busey |
| 7,783,744 B2 | 8/2010 | Garg |
| 7,890,802 B2 | 2/2011 | Gerber |
| 7,930,396 B2 | 4/2011 | Trinon |
| 7,936,867 B1 | 5/2011 | Hill et al. |
| 7,945,860 B2 | 5/2011 | Vampenepe |
| 7,966,398 B2 | 6/2011 | Wiles |
| 8,051,164 B2 | 11/2011 | Peuter |
| 8,224,683 B2 | 7/2012 | Manos |
| 8,266,096 B2 | 9/2012 | Navarrete |
| 8,457,928 B2 | 6/2013 | Dang |
| 8,478,569 B2 | 7/2013 | Scarpelli |
| 8,674,992 B2 | 3/2014 | Poston |
| 8,689,241 B2 | 4/2014 | Naik |
| 8,743,121 B2 | 6/2014 | De Peuter |
| 8,887,133 B2 | 11/2014 | Behnia |
| 9,239,857 B2 | 1/2016 | Trinon |
| 9,398,156 B2 | 7/2016 | Snyder et al. |
| 9,535,737 B2 | 1/2017 | Joy |
| 9,557,969 B2 | 1/2017 | Sharma |
| 9,635,067 B2 | 4/2017 | Hibbard |
| 9,792,387 B2 | 10/2017 | George |
| 2007/0038499 A1 | 2/2007 | Margulies et al. |
| 2007/0299714 A1 | 12/2007 | Levine et al. |
| 2013/0223618 A1 | 8/2013 | Hemm et al. |
| 2014/0081689 A1 | 3/2014 | Steiner et al. |
| 2015/0106119 A1* | 4/2015 | McCafferty ............ G16H 40/20 705/3 |
| 2015/0106145 A1 | 4/2015 | Hamilton et al. |
| 2015/0106500 A1 | 4/2015 | Fakhouri et al. |
| 2015/0178686 A1 | 6/2015 | McCord |
| 2015/0207937 A1 | 7/2015 | D'Arcy |
| 2017/0052824 A1* | 2/2017 | Sharma .................. G06F 9/453 |
| 2018/0197123 A1* | 7/2018 | Parimelazhagan ......................... G06Q 10/0633 |

* cited by examiner

DYNAMIC AGENT MANAGEMENT FOR MULTIPLE QUEUES

CROSS REFERENCE TO RELATED APPLICATIONS

The present disclosure is a continuation of U.S. patent application Ser. No. 16/116,679, filed Aug. 29, 2018, the entirety of which is incorporated by reference into the present disclosure.

BACKGROUND

A request management system, also referred to as a ticketing system or a help desk, is a system that enables agents to keep track of requests and other customer-care-related issues. The request management system receives a submission from a user and generates a work item to represent the submission. The request management system then assigns the work item to a queue managed by one or more agents. The queue serves as a temporary storage organizing the work items until an agent is available.

SUMMARY

Enterprises may use request management systems to organize submissions received from employees and customers. In some cases, an enterprise may use a request management system that is provided and supported by a remote network management platform serving the enterprise. Some request management systems use multiple queues to organize work items according to different aspects of an enterprise, such as a billing queue, a products queue, a callback request queue, and a software assistance queue, etc. When multiple queues are used, a group of agents is often assigned to manage each queue. Although assigning a group of agents to each queue can enable the agents to specialize on a particular aspect of the enterprise, this arrangement often leads to some agents being underutilized while other agents are overloaded depending on the flow of new work items into the queues.

The embodiments herein introduce dynamic agent management for multiple queues. In particular, dynamically managing agents may involve enabling agents to address work items across multiple queues according to predefined assignment rules. The predefined assignment rules may specify that a group of agents is to prioritize addressing work items in a particular queue while also further enabling these agents to address work items in other queues based on various factors, such as the workload in the particular queue, the duration work items have been in other queues, and priorities associated with resolving work items in other queues. For example, two separate groups of agents may both be designated to address work items assigned to a first queue, but one of the groups may also be designated to address and prioritize work items assigned to a second queue. In such an example, agents from the group capable of addressing both queues may help address work items in the first queue when the second queue is empty. By dynamically expanding the number of queues that an agent is able to address work items from, the agent may continuously address work items that remain unaddressed rather than waiting for new work items to be assigned to a particular queue. As a result, work items may be resolved more quickly regardless of which queue they are assigned to. In addition, agents are better utilized since agents that normally would be underutilized are able to address work items in other queues, which in turn can help agents that would otherwise be overloaded.

Accordingly, a first example embodiment may involve a computational instance disposed within a remote network management platform. The remote network management platform manages a managed network by way of the computational instance. The computational instance may contain a plurality of queues. A first group of agents may be assigned to address work items in a first queue of the plurality of queues and a second group of agents may be assigned to address work items in the first queue and a second queue of the plurality of queues. The second group of agents may prioritize addressing work items in the second queue over addressing work items in the first queue. A computing device within the computational instance may be configured to assign a particular work item into the first queue according to a set of routing rules. The particular work item may originated by way of a user interface of a client device associated with the managed network and the routing rules may incorporate a geographical location of the client device. The assignment of the particular work item into the first queue may initiate a timer that records a duration that the particular work item is in the first queue. The computing device may also be configured to assign one of the second group of agents to address the particular work item based on the particular work item being assigned to the first queue and the duration that the particular work item is in the first queue exceeding a pre-determined value.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
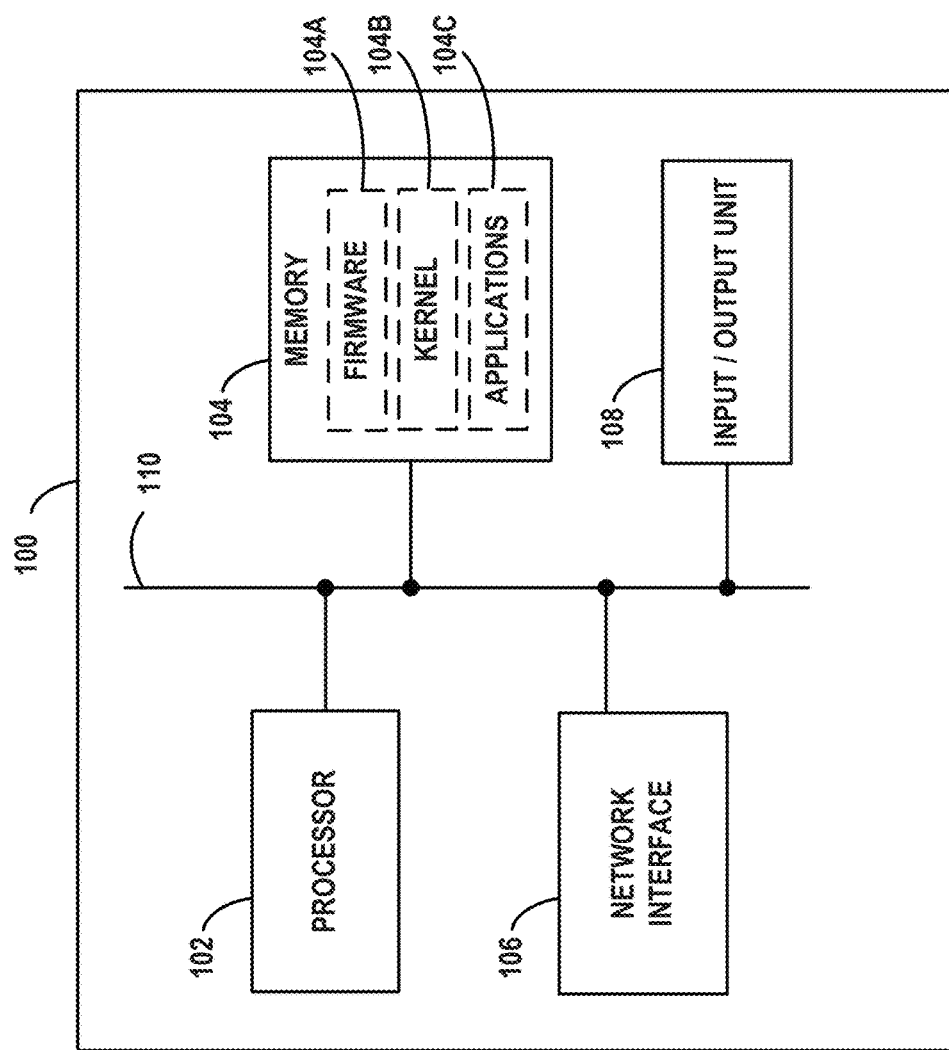
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
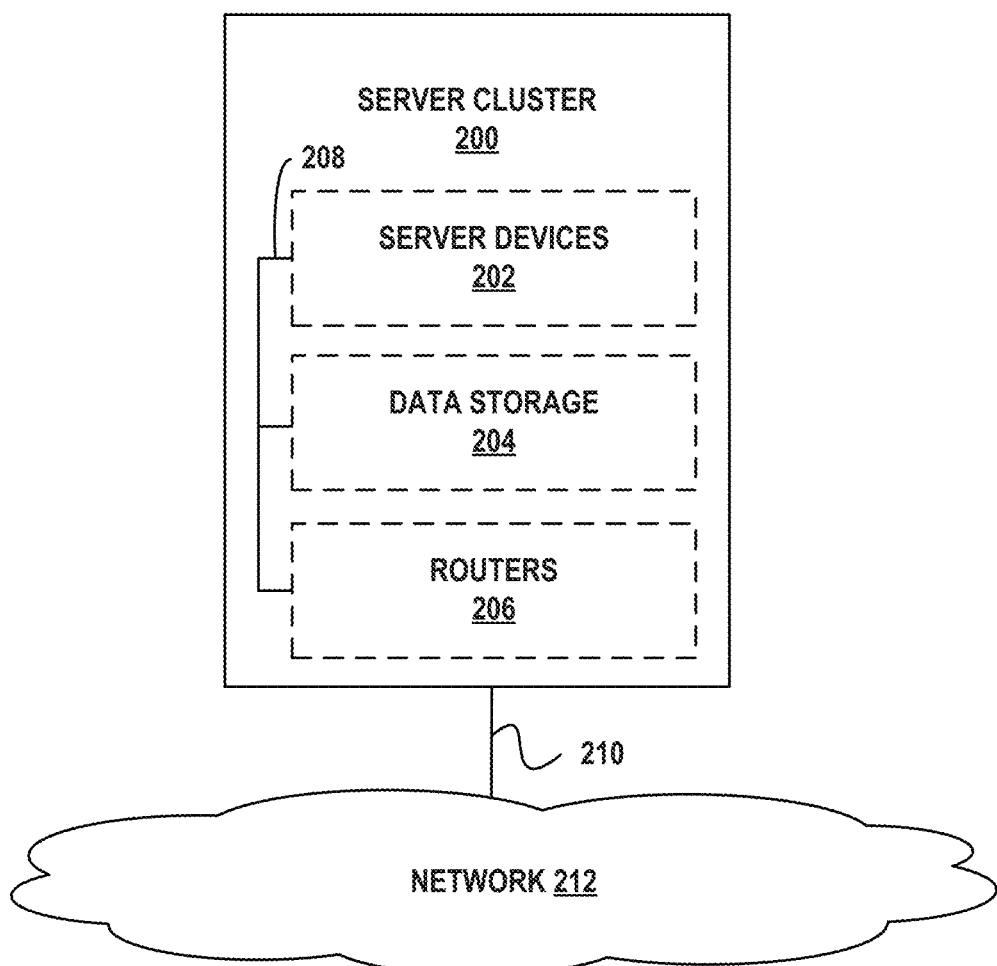
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PUP Hypertext Preprocessor (PUP), Active Server Pages (ASP), JavaScript, and so on. Computer program code written in these languages may facilitate the providing of web pages to client devices, as well as client device interaction with the web pages.

III. Example Remote Network Management Architecture

Figure 3:
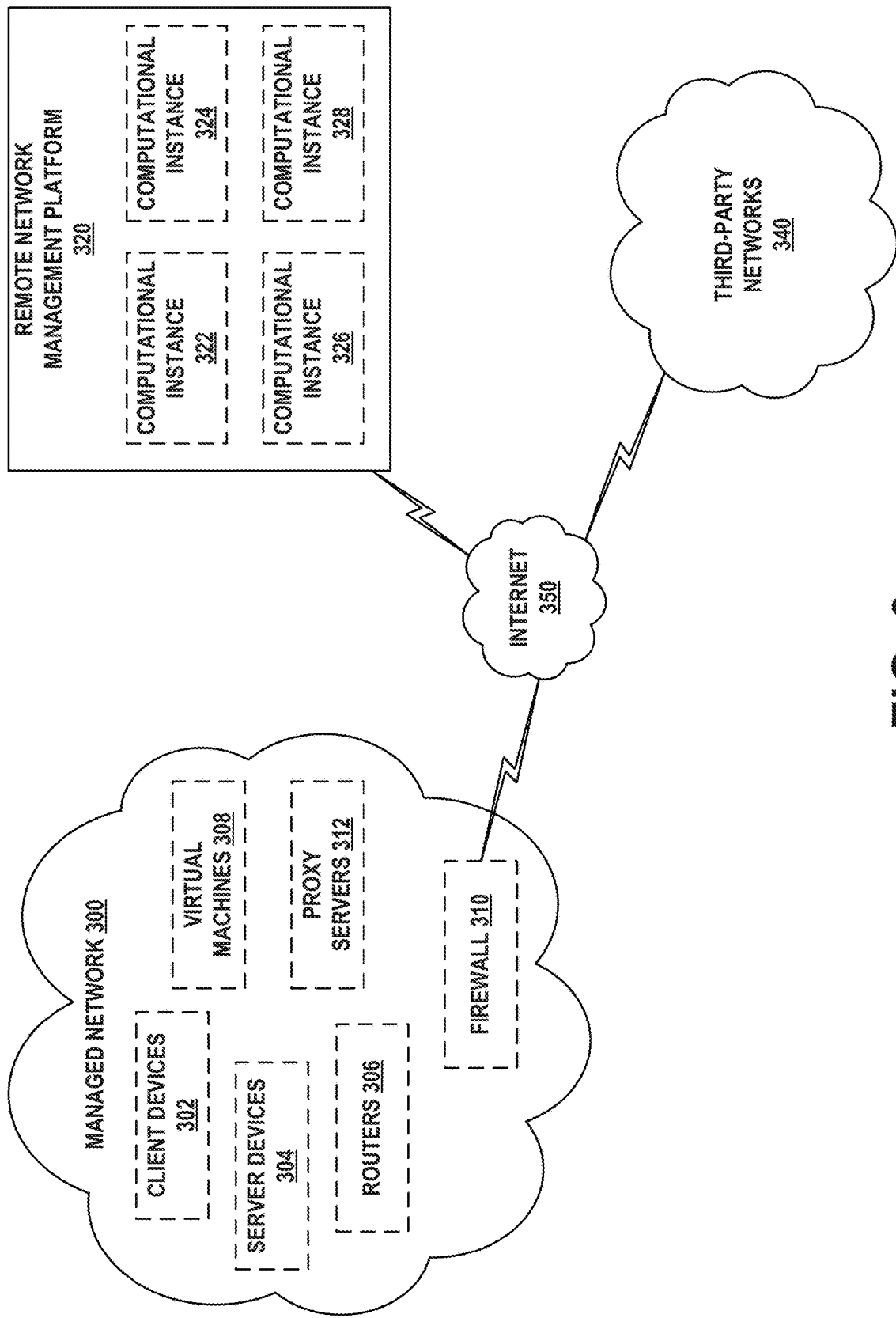
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
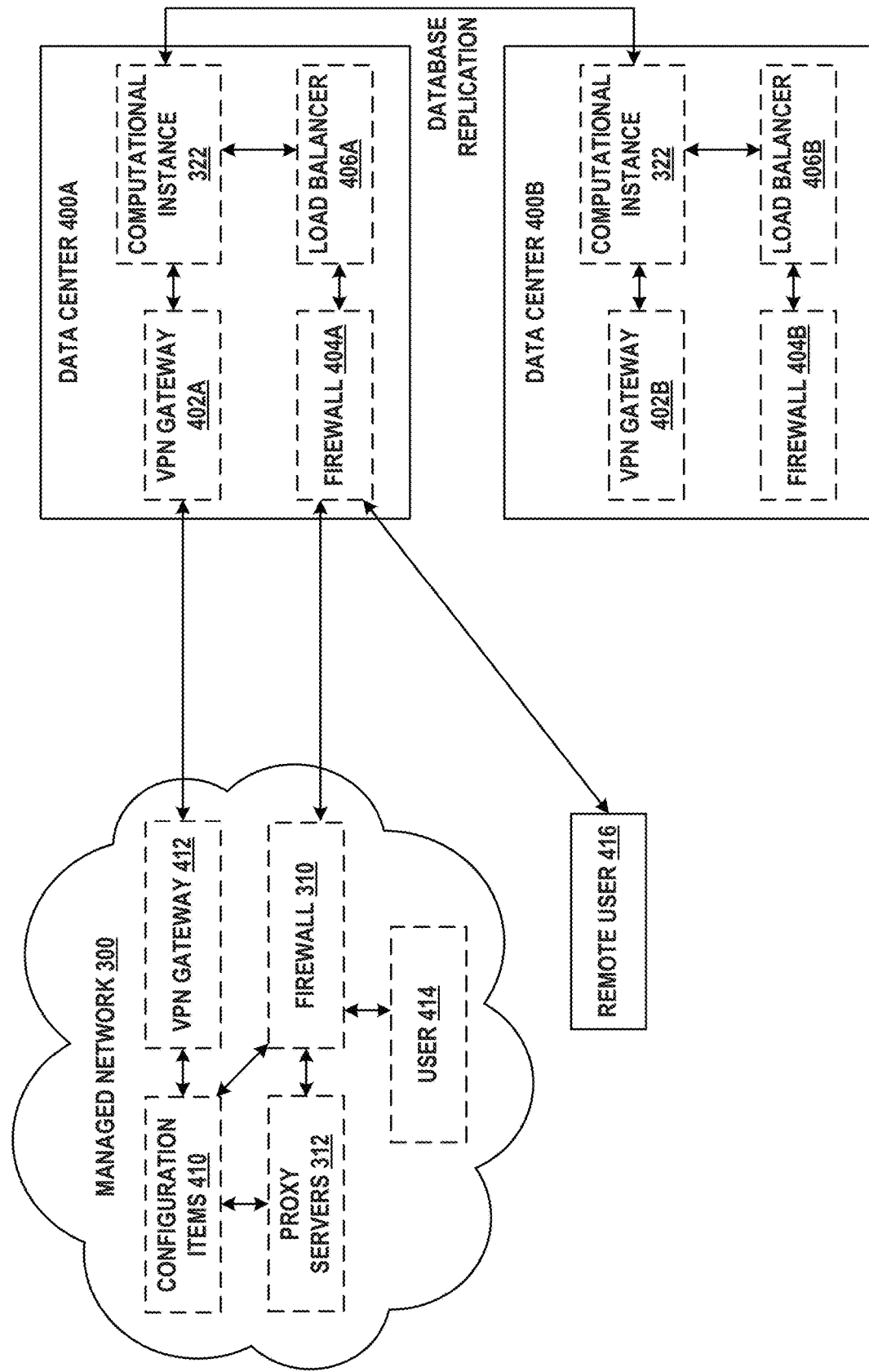
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
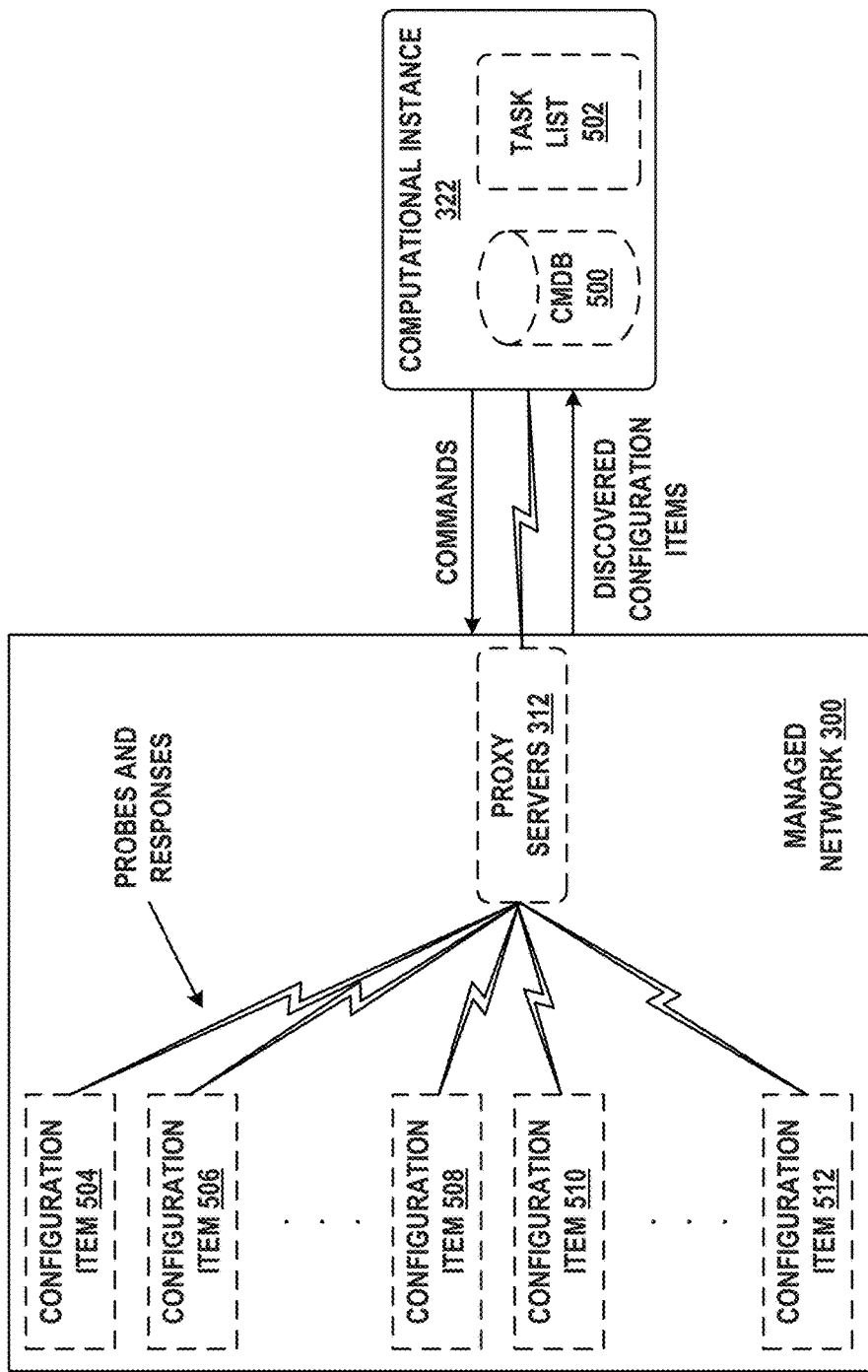
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
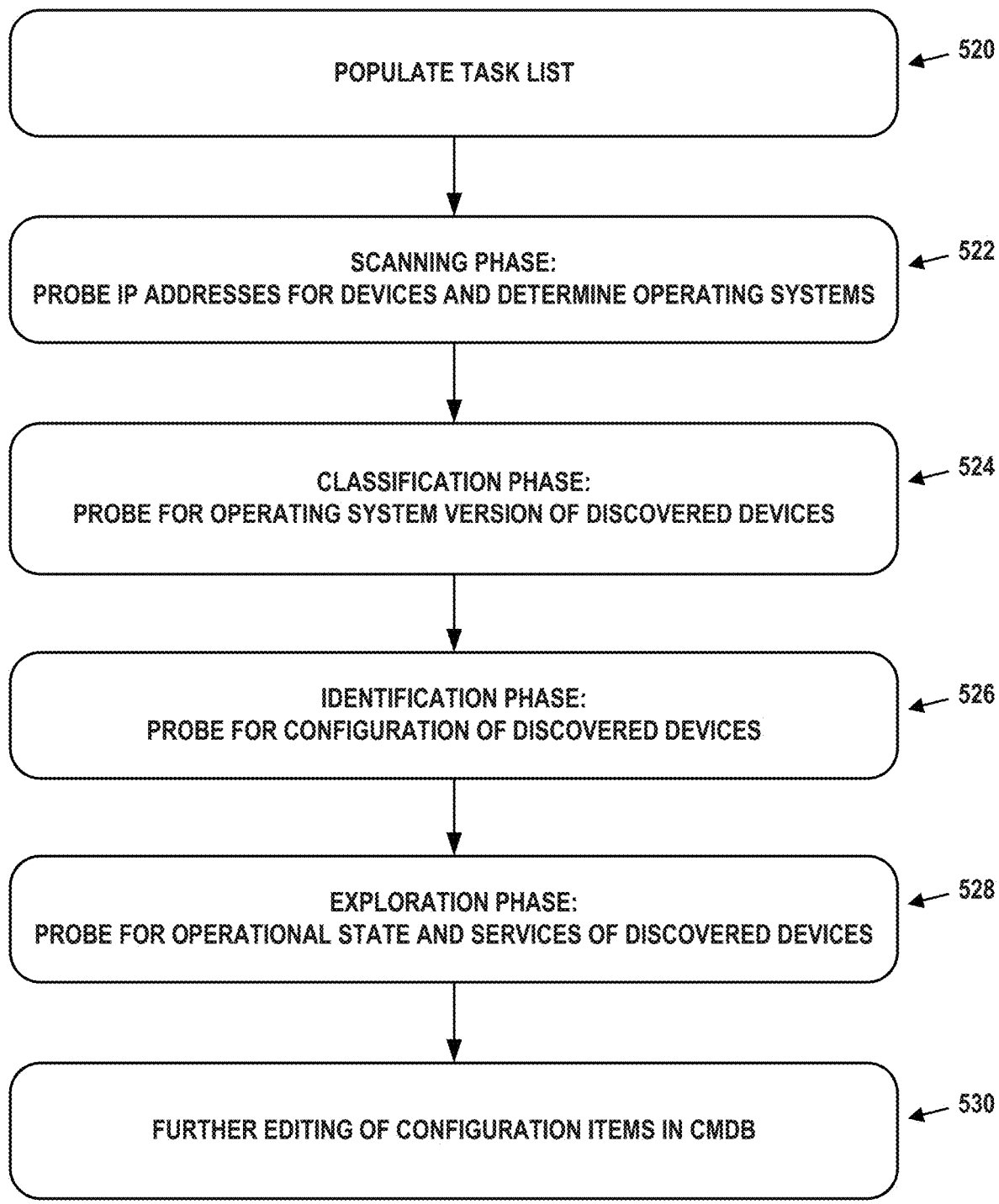
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Example Dynamic Queue Management

A request management system may receive and organize user requests and other customer-care-related issues for an enterprise. For each submission received, the request management system may generate a work item to represent the submission and assign that work item into a queue. As such, the request management system may help an enterprise manage and address requests and issues received from employees and customers by providing organizational framework.

The work item may include information about the underlying request or issue represented by the work item. For instance, a work item representing an employee request may specify information that can assist the agent who is addressing the work item. The information may include the employee's name, position within the enterprise, geographic location, and an indication of the request (e.g., a summary). In some examples, a work item may include minimal information about the represented request or issue, but rather primarily serve as a placeholder in a queue until addressed by an agent. The information included within a generated work item may be selected by an administrator overseeing the request management system.

The request management system may receive customer or employee requests or issues in various communication formats, such as telephone calls, virtual chat messages, cases for inputting information, and emails, among other possible formats. The type of communication format used to submit a request or issue can impact the amount of information about the request or issue that is included within the associated work item. For example, a work item representing a request placed in a telephone call format may include less information than a work item representing an issue received in an email format. In some cases, an agent may address a work item using the same communication format that the request or issue was submitted.

To further illustrate some formats that the request management system may manage, short descriptions of a few examples are presented. A telephone call is real-time voice communication by a customer or employee seeking to directly communicate with a representative of the enterprise. For example, the request management system may connect a customer's telephone call with a customer representative within the enterprise. A virtual chat represents communication submitted by a customer or employee via a messenger interface (e.g., via an instant messenger or chat application). In particular, an employee or customer may use a messenger application to participate in real-time virtual text communication with an agent. As an example, a customer may request information regarding a product using virtual chat.

An email may be a message sent to the request management system by an employee or customer serviced in non-real-time. A case may be a predefined form that a customer or employee can complete and submit to the request management system for review by an agent (e.g., via a web interface). In some instances, the creation of a case may take place during communication (e.g., phone call, virtual chat) between an agent and customer/employee. The agent may compile information into a case form based on information provided by the employee or customer.

It is possible that the request management system may receive numerous submissions from employees and customers within a short time period. To manage the high influx of incoming requests and issues, the request management may include one or more computing systems capable of generating and assigning work items representing the various submissions into queues.

Agents may address work items placed into queues by the request management system. An agent may be a representative of the enterprise capable of addressing work items. As such, an agent may be a human agent or a virtual agent. A human agent may be an employee of the enterprise that can review and address work items. For example, the IT group within the enterprise may serve as human agents that address requests and issues submitted by employees. As another example, an enterprise may include a customer representative group consisting of agents that addresses submissions from customers.

Virtual agents may also be used to address and resolve work items assigned to queues by the request management system. A virtual agent may be a program based on artificial intelligence (AI) that can provide automated customer service, including the ability to address and resolve various types of work items. In particular, the AI may involve using machine learning and/or natural language processing, among other possible techniques. Each virtual agent may use AI and cognitive computing processes to communicate with the employee or customer submitting the request or issue. For instance, a virtual agent may engage in email, virtual chat, or voice communication. The virtual agent may be able to understand customer intent (e.g., input from the user of the computing device) and can provide personalized answers to questions in a humanlike manner.

In some instances, a virtual agent may address work items in a manner similar to a human agent. For instance, a virtual agent may use conversational technology to understand the intent of a user submitting the work item and responsively provide personalized answers to questions in a humanlike manner. The virtual agent may communicate with users submitting work items via email, live chat, or another messenger application.

In some examples, a virtual agent may initially address a work item and subsequently connect the customer or employee who submitted the represented issue or request with a human agent. For example, a virtual agent may obtain information regarding an issue represented by a work item, then provide the work item along with the obtained information to an available human agent. In other examples, a virtual agent may also address and resolve work items without human agent intervention. In particular, the virtual agent might only submit the work item to a human agent when the virtual agent is unable to resolve the request associated with the work item. For example, the remote management system or the virtual agent itself may determine that the difficulty in resolving a work item exceeds a highest threshold difficulty level that the virtual agent is capable of handling. As a result, a human agent may be reassigned to the work item.

An agent may address a work item using various communication formats, the selection of which may depend on the type of communication used to submit the represented request or issue. For example, an agent may address a work item representing a telephone call by engaging in real-time voice communication with the employee or customer. In some cases, an agent may address and resolve a work item sometime after the work item was created by the request management system. For instance, the agent may resolve a work item without participating in real-time communication with the employee or customer who submitted the request or issue when the work item does not require direct communication. As an example, a work item with a request for approval (e.g., an email for a new software application) may enable an agent to review the request and approve without additional communication.

After generating a work item to represent a submission from an employee or customer, the request management system may assign the work item to a queue to await agent review. The request management system may use one or more queues to organize work items to enable efficient resolution by agents. A queue is a structure that can organize the work items generated by the request management system to represent different request and issues submitted for agent review. One possible implementation of a queue is a database table or a file, both being persistent storage. Alternatively, non-persistent storage, such as main memory, could be used.

Different types of queues can be used within examples. Some examples may involve using one or more structured queues. A structured queue arranges assigned work items in a fixed, predictable position. For instance, a first-in first-out (FIFO) queue is a type of structured queue that involves organizing work items according to the order that requests or issues are received. By using a FIFO queue, work items may be addressed in a predictable, sequential order.

Some examples may involve using one or more unstructured queues that do not arrange incoming work items in a predictable manner. For example, the request management system may use a ranking system when generating work items to associate a level of priority with each work item assigned to a queue and accessible by the agents. As a result, agents may selectively address some work items that have remained within the queue for a shorter duration than other work items. Other types of queues may be used by an example request management system.

When using multiple queues, a request management system may assign work items into multiple queues according to a set of routing rules. The set of routing rules may define how the request management system should organize the work items into the available queues based on factors that can vary within examples. For instance, the routing rules may involve factoring the geographic location of the device used by the customer or employee submitting the represented issue or request.

In some examples, the routing rules may factor the customer or employee status of the person submitting the request or issue. For example, the request management system may identify issues or requests originating from accounts with a Very Important Person (VIP) status and assign work items representing those submissions into a VIP queue. The routing rules may factor other criteria that helps organize the work items in a manner that can reduce the duration that each work item spends assigned to a queue.

Once work items are assigned into queues, assignments may dictate how agents should address the work items. With multiple queues, assignment rules may help organize available agents to efficiently address work items in a timely manner. Example assignment rules are further described below in detail.

In some examples, a request management system used by an enterprise is provided and supported by a remote network management platform. For instance, remote network management network 320 may provide and support the remote management system used by managed network 300. The remote management system may receive requests and issues that originate from computing devices in managed network 300 (e.g., client devices 302). The remote management system may further assign work items representing the received requests and issues into multiple queues for agents within managed network 300 to address.

An example implementation may involve remote network management platform 320 managing managed network 300 by way of computational instance 326. In particular, computational instance 326 may be disposed within remote network management platform 320 and may include multiple queues for organizing work items for agent review. As such, a computing device within computational instance 326 may perform functions of a request management system, such as receiving and managing requests and issues from employees and customers associated with managed network 300. The computing device may also generate work items to represent the received requests and issues and assign the work items into the multiple queues for agents within managed network 300 to address. In some examples, multiple computing devices could perform these functions. In further examples, agents associated with remote network management platform 320 may assist with addressing and resolving work items.

Figure 6:
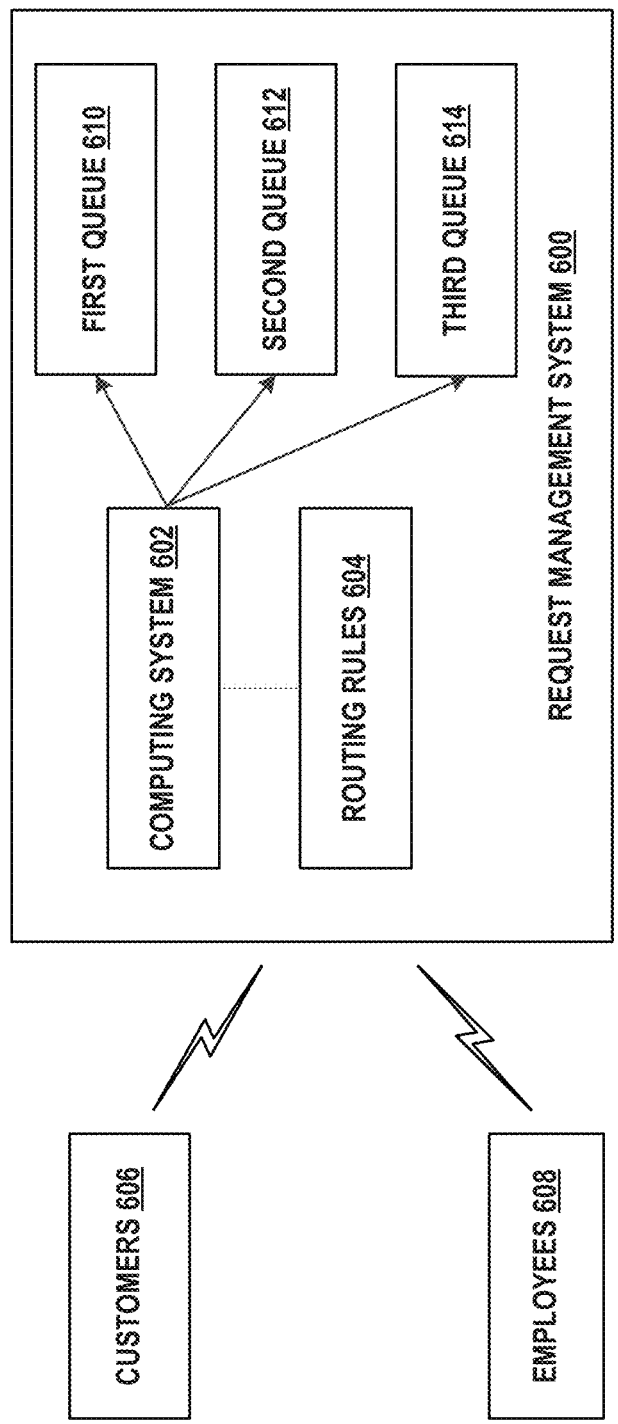
FIG. 6 depicts a request management system arrangement, in accordance with example embodiments.

To further illustrate another example, FIG. 6 depicts a request management system arrangement. Request management system 600 includes computing system 602, routing rules 604, first queue 610, second queue 612, and third queue 614. In particular, request management system 600 may receive requests and issues from customers 606 and employees 608. Customers 606 may correspond to people outside an enterprise that may pay for services or products from the enterprise. Employees 608 may represent people that work for the enterprise. For each submission received, computing system 602 may generate a work item to represent the submission and assign the work item into first queue 610, second queue 612, or third queue 614 according to routing rules 604. By using routing rules 604, request management system 600 may organize work items based on various criteria such that each queue may represent a different aspect of the enterprise. For instance, each queue may represent a different aspect of the enterprise, such as business groups, geographic locations, products, or other aspect of the enterprise.

Request management systems may organize work items to multiple queues based on aspects of an enterprise and assign a group of agents to manage each queue. For example, an IT-related queue may be managed by a group of IT agents assigned only to that queue. Although this arrangement can enable each group of agents to specialize and focus on a queue dedicated to a particular aspect of the enterprise, the utilization of agents overall can vary depending on the incoming flow of submissions. In particular, a queue may experience a rapid influx of new work items temporarily overloading the associated group of agents. As a result, work items placed into that queue may experience longer-than-desired wait times until an agent is available. At the same time, other queues may have few to none work items requiring attention from their respective agent groups. The agents managing these queues are underutilized since they may need to wait for new work items to be assigned into their queues. Thus, current request management systems may fail to adequately adapt the workloads of agents as the quantities of work items assigned to queues change over time.

Further, some request management systems may attempt to balance the work loads of agents by transferring work items between queues. In particular, a request management system may transfer work items from busy queues into less busy queues. Transferring work items between queues, however, can cause issues with keeping accurate metrics regarding each work item, such as the overall duration that each work item has been assigned to queues. Additionally, it is possible that high volumes of transferring work items between queues might result in losing track of some of the work items overall.

Example implementations presented herein use dynamic agent management to balance the workloads of agents while also reducing the durations that work items remain assigned to queues. Dynamic agent management may involve assigning agents to address work items in queues according to assignment rules that enable underutilized agents to expand the queues that they are able to address work items from. As a result, the underutilized agents may address work items within other queues and assist overloaded agents. In turn, work items may remain within queues for shorter durations since the pool of available agents expands to meet fluctuations in work items assigned to the various queues across time. As work items wait in a queue and as overflow threshold are met, the pool of eligible agents that can address the work items may expand. Overflowing a work item from one queue into another queue might fail to reduce the duration that the work item remains within queues. Thus, some examples involve expanding the number of available agents that can address work items within different queues to reduce the durations that work items await in queue.

Some examples of dynamic agent management may involve specifying assignment rules that change as a work item waits in a queue. Each queue may be governed by a different assignment rules capable of changing based on durations of work items within the queues. In particular, as one or more duration thresholds are met by a work item awaiting review, the assignment rules may expand the pool of agents (or agent groups) that are eligible to address the work item. At the same time, the assignment strategy that specifies selection of agents (e.g., selecting an agent with the most available capacity vs. agent with longest availability) can be consistently applied to the expanding pool of eligible agents.

The expanding pool of agents may be still governed by a prioritization scheme that enables each agent group to prioritize the queues that they are servicing. For instance, the queues can be prioritized in sequential order of priority. In some examples, the prioritization scheme may specify for multiple queues to share a priority. For instance, an agent group may prioritize addressing work items a first queue above all other queues and equally prioritize addressing work items within a second queue and work items within a third queue. As a result, each agent group may have full control over the prioritization of addressing work items even as agents are asked to provide assistance addressing work items in other queues to help other agent groups with their excess bandwidth.

Figure 7A:
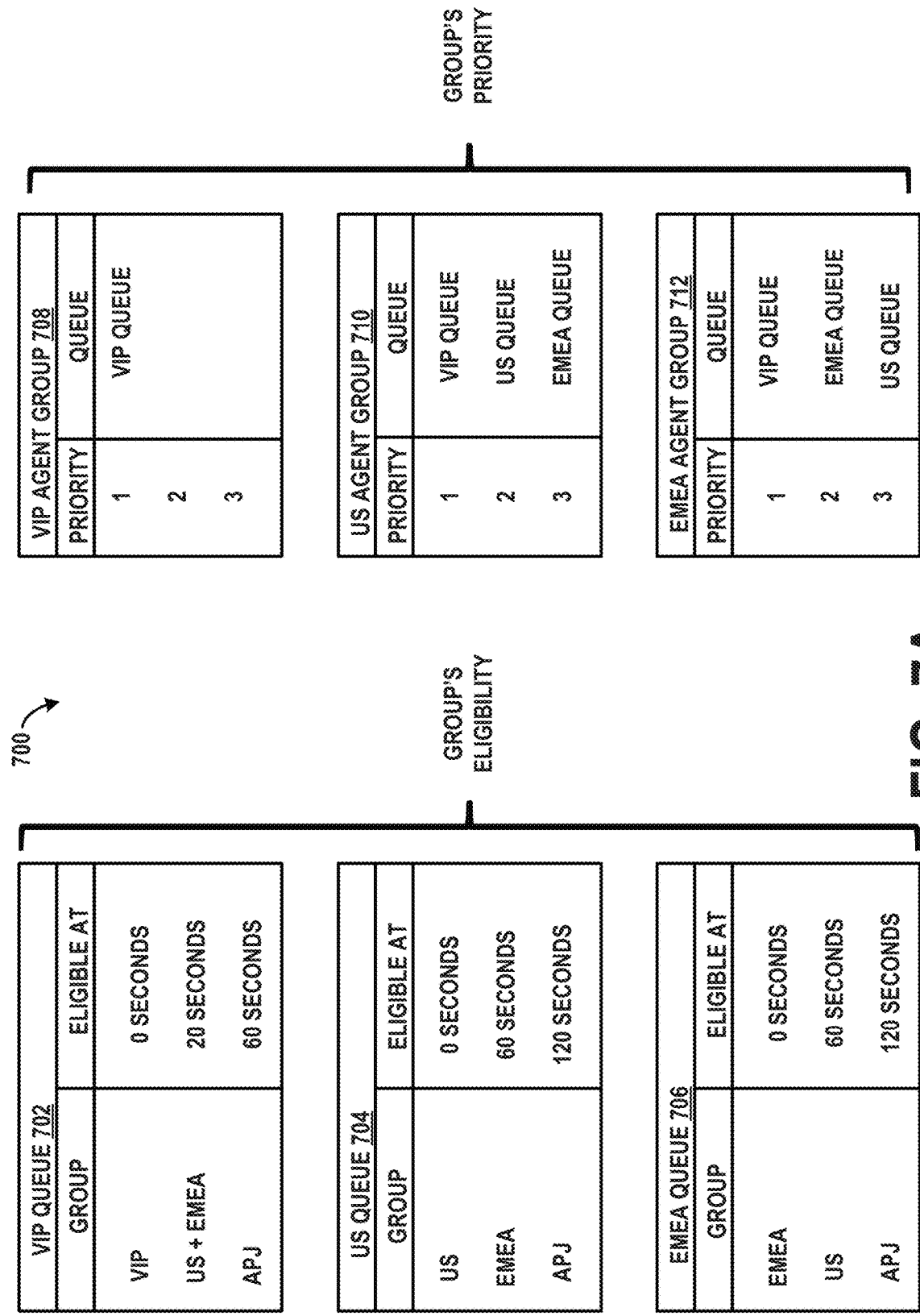
FIG. 7A represents a dynamic agent management layout, in accordance with example embodiments.

FIG. 7A represents a dynamic agent management layout. In particular, dynamic agent management layout 700 includes a Very Important Person (VIP) queue 702, a United States (US) queue 704, and a Europe, Middle East, and Africa (EMEA) queue 706. In addition, dynamic agent management layout 700 also includes agents shown arranged into three groups: a VIP agent group 708, a US agent group 710, and an EMEA agent group 712. Other example dynamic agent management layouts can include more or fewer queues and more or fewer agent groups.

Dynamic agent management layout 700 represents a possible arrangement for enabling agents to dynamically address work items assigned to a queue by a request management system. In particular, the dynamic management may enable agents to address work items assigned to multiple queues based on eligibility rules and priorities set forth in assignment rules governing the agents. Each work item may represent a request or issue originating from a device associated with an employee or customer. The different queues are shown in FIG. 7A are structured queues. In other example layouts, unstructured queues may also be used.

As shown in FIG. 7A, assignment rules that specify management of agents addressing queues may include queue rules and agent group rules. The queue rules may indicate which groups of agents may address work items within each queue and when agents from the groups of agents are eligible to address work items. In particular, the queue rules may specify that agents from some groups of agents may need to wait for a work item to be assigned to a given queue for a predefined duration before the agents are eligible to address the work item. Each group of agents may follow a different set of agent group rules that specify how agents in the group should prioritize addressing work items from the queues.

VIP queue 702 may organize work items that the request management system identifies as important. In particular, the routing rules utilized by the request management system when assigning work items into queues may specify to assign work items qualifying as important into VIP queue 702. For example, the routing rules may specify that work items representing requests or issues originating from a customer or employee account with a VIP status should be assigned to VIP queue 702. The routing rules may specify other criteria that indicate when a work item should be assigned to VIP queue 702, such as urgency or the subject matter associated with the represented request or issue.

All agent groups shown in FIG. 7A are capable of addressing work items from VIP queue 702. The agent groups, however, have different eligibilities that depend on a duration that work item has been assigned to VIP queue 702. First, agents from VIP agent group 708 are eligible to address work items as soon as a work item is assigned to VIP queue 702 (i.e., eligible at zero seconds). Thus, VIP agent group 708 may address new work items as the request management system assigns the work items into VIP queue 702.

Conversely, agents from US agent group 710 or EMEA agent group 712 are not immediately eligible to address a work item assigned into VIP queue 702. Rather, agents from both groups do not become eligible to address a work item from VIP queue 702 until the work item has been assigned for at least 20 seconds. The 20 second eligibility threshold represents a predefined duration threshold that may prevent agents from US agent group 710 or EEA agent group 712 from focusing only on work items assigned into VIP queue 702. This way, agents from US agent group 710 or EMEA agent group 712 may assist with addressing work items VIP queue 702 while still addressing new work items arriving in their respective queues. As a result, in some situations, an underutilized agent from US agent group 710 or EMEA agent group 712 may assist overloaded agents within VIP agent group 708 by addressing an unaddressed work item that meets the duration threshold. Further, agents from an Asia-Pacific (APJ) group (not shown) become eligible to address a work item assigned in VIP queue 702 when the duration that the work item has been assigned meets or exceeds 60 seconds.

US queue 704 may organize work items that the request management system identifies as associated with the United States according to routing rules. For example, the routing rules may specify that work items representing requests or issues originating from customers or employees with a geographic location in the United States should be assigned to US queue 704 if those work items do not qualify for VIP queue 702. Organization of work items according to geographic locations can help reduce language barriers that may arise between employees and customers submitting requests and the agents addressing these requests.

In the example shown in FIG. 7A, only a subset of the agent groups is capable of addressing work items assigned into US queue 704. In particular, agents from US agent group 710 are eligible to immediately address work items assigned to US queue 704. US agent group 710 may serve as the primary collection of agents dedicated to address work items that qualify for the US queue 704. Along with agents from US agent group 710, agents from EMEA agent group 712 are also eligible to address work items from US queue 704. Agents from EMEA agent group 712, however, are not eligible to address a work item from US queue 704 until the work item has been assigned for at least 60 seconds. Agents from the Asia-Pacific (APJ) group are also able to address work items from US queue 704 only after a work item has remained in US queue 704 for at least 120 seconds.

EMEA queue 706 may organize work items identified as associated with the region of Europe, the Middle East, and Africa according to routing rules. For example, the routing rules may specify that work items representing requests or issues originating from customers or employees with a geographic location in Europe, the Middle East, or Africa should be assigned to EMEA queue 706. The routing rules may specify other criteria that indicate when a work item should be assigned to EMEA queue 706 as well.

Similar to US queue 704, only a subset of the agent groups are eligible to address work items from EMEA queue 706. In particular, agents from EMEA agent group 712 can immediately address work items while agents from US agent group 710 only become eligible after a work item has been assigned for at least 60 seconds. Further, agents from the Asia-Pacific (APJ) group become eligible when a work item has been assigned to EMEA queue 706 for at least 120 seconds.

For both US queue 704 and EMEA queue 706, agents from VIP agent group 708 are not eligible to address work items. Rather, as indicated above, the agents from VIP agent group 708 are solely assigned to VIP queue 702 to ensure that these agents are able to rapidly address any new work items assigned to VIP queue 702. Due to VIP queue 702 representing high priority work items, the agents can remain free to address new VIP work items and may also be unavailable when already addressing another work item from VIP queue 702. This way, a work item assigned to VIP queue 702 is more likely to be addressed immediately rather than waiting for an agent in VIP agent group 708 to finish addressing a work item assigned to another queue (e.g., US queue 704, EMEA queue 706).

Along with the eligibilities specified for agent groups shown in FIG. 7A, the assignment rules also indicate queue priorities that each group should follow when addressing work items. In particular, to efficiently address work items, agents are shown organized into groups with each group designated to address work items according to the assignment rules. The assignment rules specify which queues agents are able to address work items within, a priority order that agents should follow when assigned to address work items from multiple queues, and other criteria to follow (e.g., durations a work item must be in a queue before an agent may address the work item).

Agents within US agent group 710 may address work items assigned to any of the three queues shown in FIG. 7A according to the assignment rules. In particular, the assignment rules specify for agents within US agent group 710 to prioritize addressing work items in the following order: (1) VIP queue 702, (2) US queue 704, and (3) EMEA queue 706. This way, agents from US agent group 710 may assist with addressing work items assigned into VIP queue 702 while also being able to address work items within US queue 704 and EMEA queue 706. Thus, when an agent from US agent group 710 is eligible to address work items in VIP queue 702 and another queue (e.g., US queue 704, EMEA queue 706), the agent may prioritize and address the work item from VIP queue 702. For example, in a situation where VIP queue 702 includes a work item that has been assigned for a duration of 20 seconds or longer, an agent from US agent group 710 should prioritize and address that work item over addressing work items in other queues.

EMEA agent group 712 represents another group of agents that can address work items according to assignment rules of dynamic queue arrangement 700. Similar to agents within US agent group 710, agents within EMEA agent group 712 may address work items assigned to any of the three queues shown in FIG. 7A according to the assignment rules. In particular, the assignment rules specify for agents within EMEA agent group 712 to prioritize addressing work items in the following order: (1) VIP queue 702, (2) EMEA queue 706, and (3) US queue 704. This way, agents from EMEA agent group 712 may assist with addressing work items assigned into VIP queue 702 when eligible while also being able to address work items within US queue 704 and EMEA queue 706. Thus, when an agent from EMEA agent group 712 is eligible to address work items in VIP queue 702 and another queue (e.g., US queue 704, EMEA queue 706), the agent may prioritize and address the work item from VIP queue 702. For example, in a situation where VIP queue 702 includes a work item that has been assigned for a duration of 20 seconds or longer, an agent from EMEA agent group 712 should prioritize and address that work item over addressing work items in other queues.

Figure 7B:
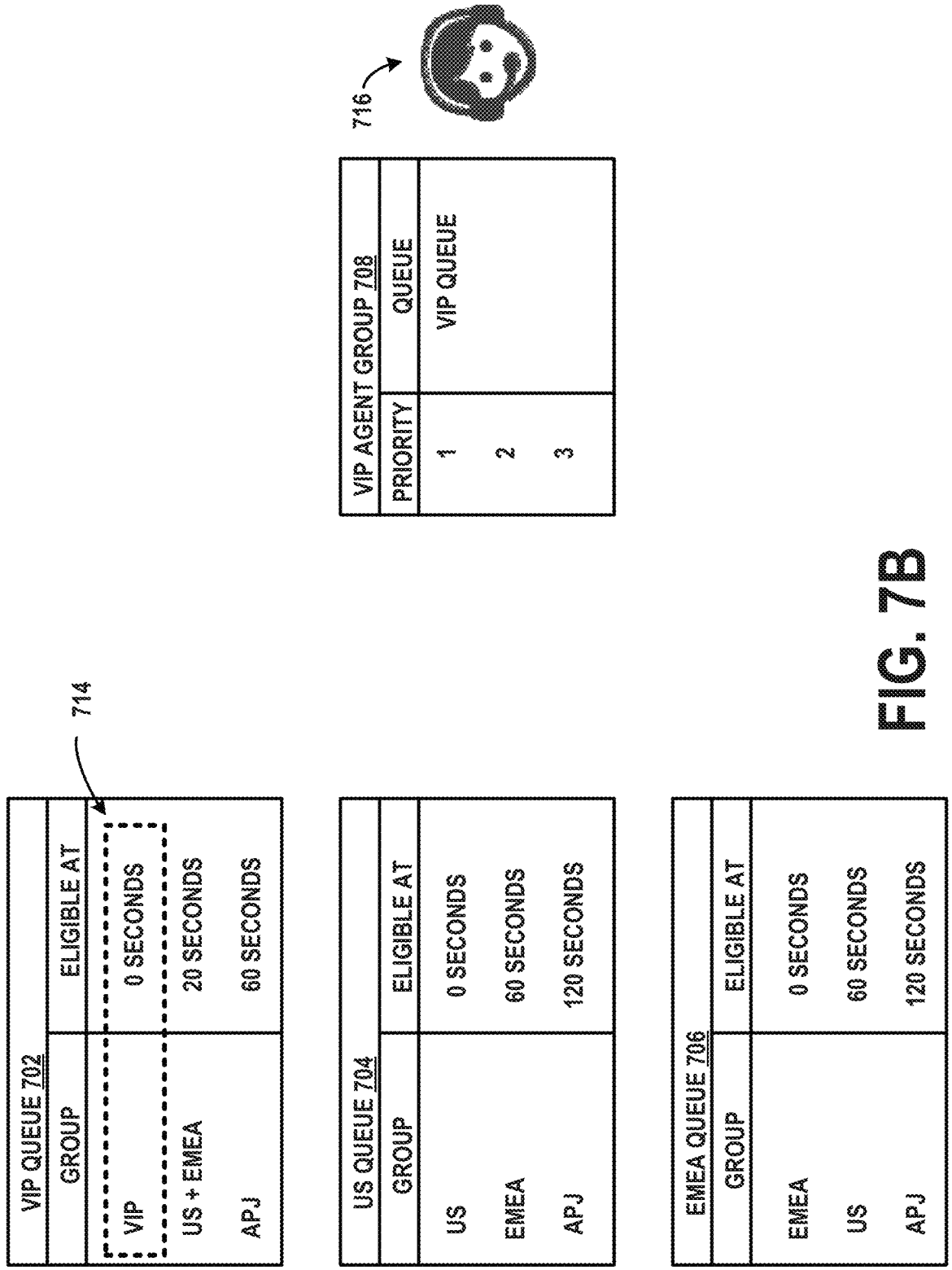
FIG. 7B represents a possible assignment of a work item to an agent, in accordance with example embodiments.

FIG. 7B represents a possible assignment of a work item to an agent. In particular, the scenario shows the request management system assigning work item 714 into VIP queue 702. As a result, agent 716 or another agent from VIP agent group 708 may immediately address work item 714 based on the eligibility for VIP agent group 708 to immediately address work items assigned to VIP queue 702 and the assignment rules specifying for VIP agent group 708 to prioritize work items within VIP queue 702. Agent 716 may receive an indication to address work item 714 or may actively address work item 714. In some examples, the request management system may directly assign work item to agent 716 upon identifying that agent 716 is available.

In some examples, agent 716 may accept and resolve work item 714 upon becoming available to perform work. For instance, agent 716 may assume responsibility and address work item 714 in response to completing another work item within VIP chat queue 702. Agent 716 and other agents within VIP agent group 708 may address work items as the work items are assigned to VIP queue 702, since VIP agent group 708 is assigned to prioritize and focus only on VIP queue 702.

Figure 7C:
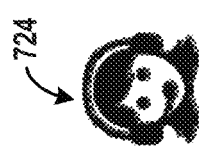
FIG. 7C represents possible assignments of work items to an agent, in accordance with example embodiments.

FIG. 7C represents other possible assignments of work items to an agent. Agent 724 is shown to represent an agent in US agent group 710 that can address work items in multiple queues according to the priorities set forth for US agent group 710.

Agent 724 and other agents in US agent group 710 can address work items that are apportioned to each of VIP queue 702, US queue 704, and EMEA queue 706. The order which agent 724 and other agents in US agent group 710 can address work items in the various queues depends on eligibility rules associated with queue (i.e., the duration each work item has remained in a given queue). For instance, agent 724 can address work item 718 assigned to VIP queue 702 after work item 718 remains in VIP queue 702 for a predefined duration (e.g., 20 seconds).

Agent 724 can address work item 720 and other work items assigned to US queue 704 immediately. In some situations, however, agent 724 may prioritize and address work item 718 before addressing work item 720. In particular, when work item 718 has been in VIP queue 702 for at least the predefined duration required before an agent in US agent group 710 can address work item 718, agent 724 may prioritize and address work item 718 before addressing work item 720. If the duration that work item 718 has been in VIP queue 702 has not met the predefined threshold, agent 724 may address work item 720. Similarly, agent 724 and other agents in US agent group 710 can address a work item in EMEA queue 706 when available (i.e., no other eligible work items await review in VIP queue 702 or US queue 704) and the duration that the work item is in the EMEA queue 706 exceeds a predefined duration (e.g., 60 seconds).

Figure 7D:
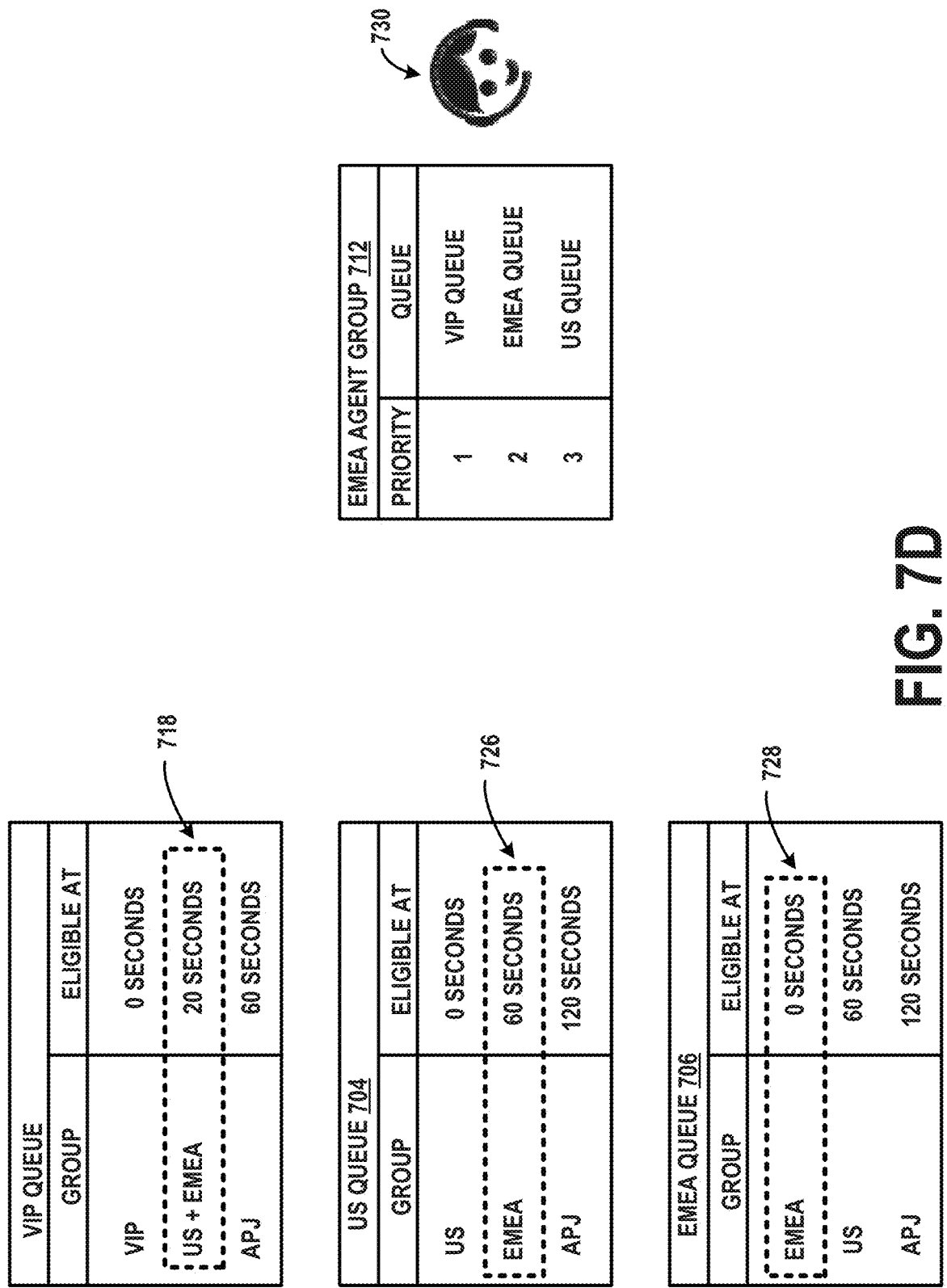
FIG. 7D represents possible resolutions of different work items by an agent, in accordance with example embodiments.

FIG. 7D represents possible resolutions of different work items by an agent. Agent 730 is shown to represent an agent in EMEA agent group 712 that can address work items in multiple queues. As such, agent 730 can represent a human agent or virtual agent participating according to the priorities set forth for EMEA agent group 712. Particularly, agents within EMEA agent group 712 are to follow assignment instructions that prioritize work items in VIP queue 702 over work items in US queue 704 and EMEA queue 706.

Agent 730 and other agents in EMEA agent group 712 can address work items that are apportioned to each of VIP queue 702, US queue 704, and EMEA queue 706 according to assignment rules used to facilitate operations performed by agents in EMEA agent group 712 and other agent groups. In particular, whether and when agent 730 and other agents in EMEA agent group 712 can address work items in the various queues depends on the duration each work item has remained in a given queue. For instance, agent 730 can address work item 718 assigned to VIP queue 702 after work item 718 remains in VIP queue 702 for a predefined duration (e.g., 20 seconds).

Agent 730 can address work item 728 and other work items assigned to EMEA queue 706 immediately. In some situations, however, agent 730 may prioritize and address work item 718 before addressing work item 726. In particular, when work item 718 has been in VIP queue 702 for at least the predefined duration required before an agent in EMEA agent group 712 can address work item 718, agent 730 may prioritize and address work item 718 before addressing work item 726. If the duration that work item 718 has been in VIP chat queue 702 does not meet the predefined threshold, agent 730 may address work item 726 first. Similarly, agent 730 and other agents in EMEA agent group 712 can address a work item in US queue 704 when the duration that the work item is in the US queue 704 exceeds a predefined duration (e.g., 60 seconds).

In some examples, different entities may develop routing rules and assignment rules implemented with a request management system. As a result, an enterprise may be able to have better local control of the agent group rules that specify rules for each agent group.

VI. Example Operations

Figure 8:
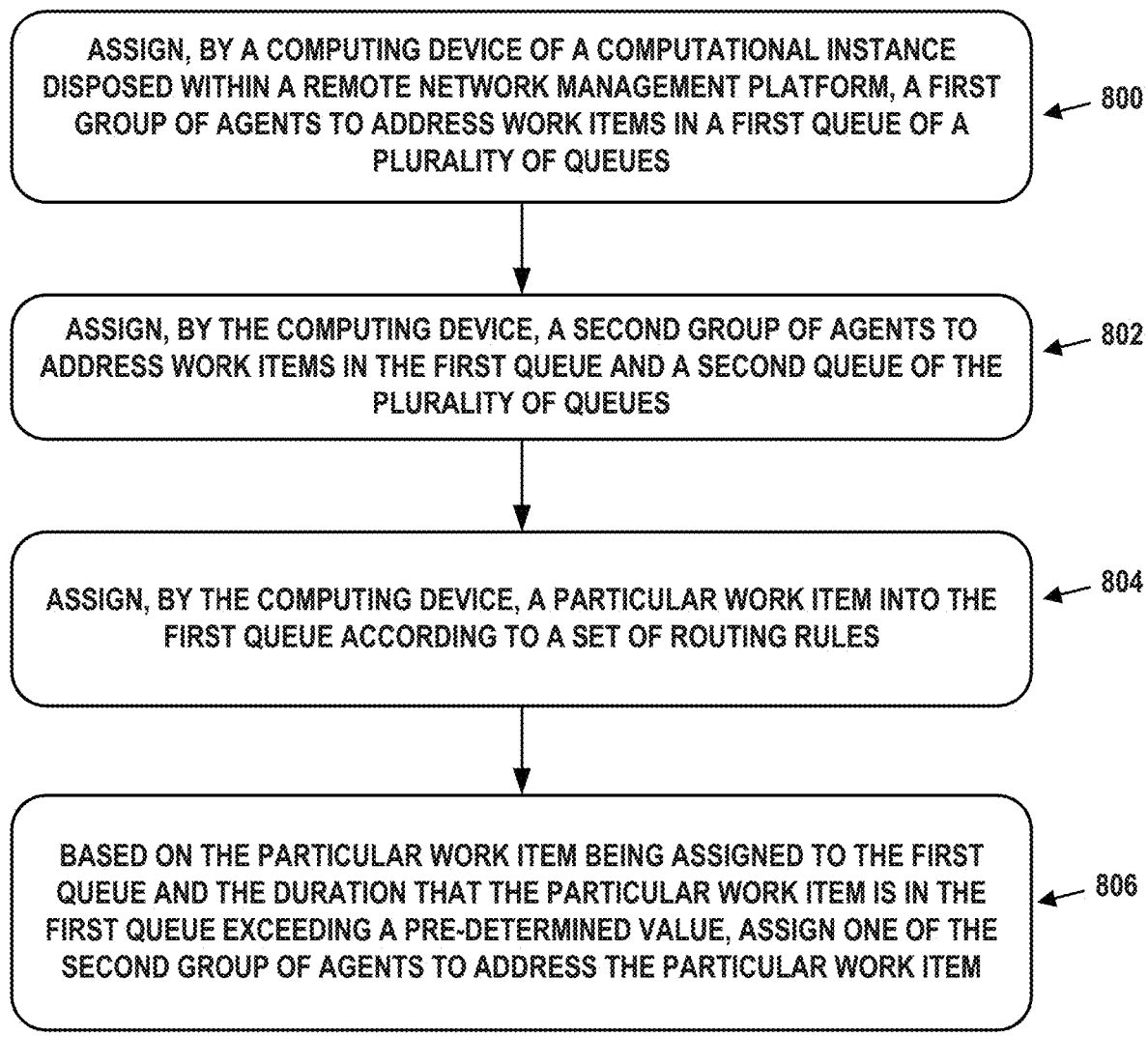
FIG. 8 is a flow chart, in accordance with example embodiments.

FIG. 8 is a flow chart illustrating an example embodiment. The process illustrated by FIG. 8 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 8 may be simplified by the removal of any one or more of the features shown therein. Further, these embodiments may be combined with features, aspects, and/or implementations of any of the previous figures or otherwise described herein.

Block 800 may involve assigning, by a computing device of a computational instance disposed within a remote network management platform, a first group of agents to address work items in a first queue of a plurality of queues.

Block 802 may involve assigning, by the computing device, a second group of agents to address work items in the first queue and a second queue of the plurality of queues. The second group of agents may prioritize addressing work items in the second queue over addressing work items in the first queue.

Some example embodiments may further include a third group of agents that is assigned to address work items in the first queue, the second queue, and a third queue of the plurality of queues. The third group of agents may prioritize work items in the third queue over work items in the first queue and the second queue. In some examples, the third group of agents may prioritize work items in the first queue over work items in the second queue.

Block 804 may involve assigning, by the computing device, a particular work item into the first queue according to a set of routing rules. The particular work item may have originated by way of a user interface of a client device associated with a managed network and the set of routing rules may incorporate a geographical location of the client device. The assignment of the particular work item into the first queue may initiate a timer that records a duration that the particular work item is in the first queue.

In some examples, the particular work item represents a request for assistance from an agent received in a virtual chat. For instance, a customer or employee may request to engage in real-time communication with an agent via a messenger software application. In other examples, the particular work item represents a request via a software application and from an employee within the managed network. For instance, the employee may submit a request for an IT agent to assist with setting up a new software application. In further examples, the particular work item represents a voice call requesting real-time communication with an agent.

In some examples, the routing rules may further incorporate a customer status of the client device such that work items originating from a given client device in the managed network having a VIP status are assigned to the first queue of the plurality of queues.

Block 806 may involve assigning one of the second group of agents to address the particular work item based on the particular work item being assigned to the first queue and the duration that the particular work item is in the first queue exceeding a pre-determined value.

Some embodiments may involve determining the duration that the particular work items is in the first queue exceeds a second pre-determined value after assigning one of the second group of agents to address the particular work item and reassigning one of the third group of agents to address the particular work item. For example, the second group of agents may include virtual agents and human agents. An embodiment may involve determining that human agents within the second group of agents are unavailable to address the particular work item and assign a virtual agent in the second group of agents to address the particular work item based on determining that the human agents within the second group of agents are unavailable.

Some embodiments may involve determining that the duration the particular work item is in the first queue exceeds a second pre-determined value after assigning one of the second group of agents to address the particular work item and assigning one of a third group of agents to address the particular work item. Third group of agents may be assigned to address work items in the first queue, the second queue, and a third queue of the plurality of queues. In addition, the third group of agents may also prioritize work items in the third queue over work items in the first queue or the second queue.

Some embodiments may involve assigning a second work item into the second queue according to the set of routing rules. The assignment of the second work item into the second queue may initiate a second timer that records a second duration that the second work item is in the second queue. The embodiments may involve assigning an agent from the second group of agents to address the second work item based on assigning the second work item to the second queue. The embodiments may further involve determining the second duration that the second work item is in the second queue exceeds a third pre-determined value and assigning one of the third group of agents to address the second work item based on the second work item being assigned to the second queue and the second duration that the second work item is in the second queue exceeding a third pre-determined value.

Some embodiments may involve determining that the particular work item represents a request for assistance that exceeds a threshold difficulty level. For instance, the threshold difficulty level may represent a highest level of difficulty that a virtual agent is capable of addressing. The embodiments may further involve determining human agents within the second group of agents are unavailable to address the particular work item and assigning a human agent within the third group of agents to address the particular work item based on determining that the particular work item represents the request for assistance that exceeds the threshold difficulty level and determining human agents within the second group of agents are unavailable to address the particular work item.

Some embodiments may involve determining a second work item originated by way of a user interface of a second client device associated with the managed network and identifying a geographic location of the second client device. The embodiments may further involve assigning the second work item into the second queue based on the geographic location of the second client device. The set of routing rules may specify assigning work items originating from client devices in the geographic location to the second queue.

Some embodiments may involve determining that a second work item represents a request for a software application received from an employee. The embodiments may further involve assigning the second work item to the second queue, where the set of routing rules specify to assign work items having requests for software applications to the second queue based on determining that the second work item represents the request for the software application received from the employee.

VII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
a processor; and
a memory, accessible by the processor, and storing instructions that, when executed by the processor, cause the processor to perform operations comprising:
assigning, via a computing device disposed within a remote network management platform, a particular work item to a first queue according to a set of routing rules, wherein the set of routing rules consider a geographical location of a client device associated with the particular work item, wherein the client device is disposed in a managed network managed by the remote network management platform, wherein a first group of agents is assigned to address work items in the first queue;
initiating, via the computing device, a timer that counts a duration of time that the particular work item is in the first queue based on the assignment of the particular work item to the first queue; and
based on the particular work item being assigned to the first queue and the duration of time that the particular work item is in the first queue exceeding a predetermined value, assigning, via the computing device, one of a second group of agents to address the particular work item, wherein the second group of agents is assigned to address work items in the first queue and a second queue.

2. The system of claim 1, wherein the set of routing rules consider a customer status of the client device associated with the particular work item.

3. The system of claim 2, wherein the customer status includes an indication of a Very Important Priority (VIP) status, and wherein work items having the indication of the VIP status are assigned to the first queue.

4. The system of claim 1, wherein a third group of agents is assigned to address work items in the first queue, the second queue, and a third queue, wherein the third group of agents prioritizes work items in the third queue over work items in the first queue and the second queue.

5. The system of claim 4, wherein the third group of agents prioritizes work items in the first queue over work items in the second queue.

6. The system of claim 5, the operations comprising:
after assigning one of the second group of agents to address the particular work item, determining the duration of time that the particular work item is in the first queue exceeds a second pre-determined value; and
reassigning one of the third group of agents to address the particular work item.

7. The system of claim 5, the operations comprising:
assigning a second work item to the second queue according to the set of routing rules, wherein the assignment of the second work item to the second queue initiates a second timer that counts a second duration of time that the second work item is in the second queue; and
assigning an agent from the second group of agents to address the second work item based on the assignment of the second work item to the second queue.

8. The system of claim 7, the operations comprising:
determining the duration of time that the second work item is in the second queue exceeds a third pre-determined value; and
based on determining that the duration of time that the second work item is in the second queue exceeds the third pre-determined value, assigning an agent from the third group of agents to address the second work item.

9. The system of claim 5, the operations comprising:
determining that the particular work item represents a request for assistance that exceeds a threshold difficulty level, wherein the threshold difficulty level represents a highest level of difficulty that a virtual agent is capable of addressing;
determining that one or more human agents within the second group of agents are unavailable to address the particular work item; and
based on determining that the particular work item represents the request for assistance that exceeds the threshold difficulty level and determining that the one or more human agents within the second group of agents are unavailable to address the particular work item, assigning a human agent within the third group of agents to address the particular work item.

10. The system of claim 1, wherein the second group of agents includes virtual agents and human agents, and wherein the operations comprise:
determining that the human agents within the second group of agents are unavailable to address the particular work item; and
based on determining that the human agents within the second group of agents are unavailable, assigning a virtual agent in the second group of agents to address the particular work item.

11. The system of claim 1, wherein the particular work item represents a request for assistance from an agent received in a virtual chat.

12. The system of claim 1, wherein the particular work item represents a voice call requesting real-time communication with an agent.

13. The system of claim 1, the operations comprising:
assigning a second work item associated with a second client device to the second queue according to the set of routing rules, wherein the second client device operates in a particular location, and wherein the set of routing rules specify to assign work items originating from client devices in the particular location to the second queue.

14. A method comprising:
assigning, by a computing device disposed in a remote network management platform, a first group of agents to address work items in a first queue of a plurality of queues;
assigning, by the computing device, a second group of agents to address work items in the first queue and a second queue of the plurality of queues;
assigning, by the computing device, a particular work item to the first queue according to a set of routing rules;
initiating, via the computing device, a timer that counts a duration of time that the particular work item is in the first queue based on the assignment of the particular work item to the first queue; and
based on the particular work item being assigned to the first queue and the duration of time that the particular work item is in the first queue exceeding a pre-determined value, assigning one of the second group of agents to address the particular work item.

15. The method of claim 14, wherein the set of routing rules consider a geographical location of a client device associated with the particular work item.

16. The method of claim 14, comprising:
determining that the duration of time that the particular work item is in the first queue exceeds a second pre-determined value after assigning one of the second group of agents to address the particular work item; and
assigning one of a third group of agents to address the particular work item, wherein the third group of agents are assigned to address work items in the first queue, the second queue, and a third queue of the plurality of queues, and wherein the third group of agents prioritize work items in the third queue over work items in the first queue and the second queue.

17. The method of claim 16, comprising:
assigning a second work item to the second queue according to the set of routing rules, wherein the assignment of the second work item to the second queue initiates a second timer that counts a second duration of time that the second work item is in the second queue; and
based on the second work item being assigned to the second queue and the second duration of time that the second work item is in the second queue exceeding a third pre-determined value, assigning one of the third group of agents to address the second work item.

18. The method of claim 16, comprising:
determining that the particular work item represents a request for assistance that exceeds a threshold difficulty level, wherein the threshold difficulty level represents a highest level of difficulty that a virtual agent is capable of addressing;
determining that one or more human agents within the second group of agents are unavailable to address the particular work item; and based on determining that the particular work item represents the request for assistance that exceeds the threshold difficulty level and determining that the one or more human agents within the second group of agents are unavailable to address the particular work item, assigning a human agent within the third group of agents to address the particular work item.

19. The method of claim 15, comprising:

determining a second work item originated by way of a second client device;

identifying a geographic location of the second client device; and based on the geographic location of the second client device, assigning the second work item to the second queue, wherein the set of routing rules specify to assign work items originating from client devices in the geographic location to the second queue.

20. An article of manufacture including a non-transitory computer-readable medium, having stored thereon program instructions that, upon execution by a computing system, cause the computing system to perform operations comprising:

assigning a first group of agents to address work items in a first queue of a plurality of queues;

assigning a second group of agents to address work items in the first queue and a second queue of the plurality of queues;

assigning a particular work item generated by a client device associated with a managed network to the first queue according to a set of routing rules;

initiating a timer that counts a duration of time that the particular work item is in the first queue based on the assignment of the particular work item to the first queue; and based on the particular work item being assigned to the first queue and the duration of time that the particular work item is in the first queue exceeding a pre-determined value, assigning one of the second group of agents to address the particular work item.

* * * * *